United States Patent
Eschinger et al.

(10) Patent No.: US 11,347,491 B2
(45) Date of Patent: May 31, 2022

(54) CONTAINERIZED APPLICATION DEPLOYMENT

(71) Applicant: MASTERCARD INTERNATIONAL INCORPORATED, Purchase, NY (US)

(72) Inventors: Ryan Eschinger, Brooklyn, NY (US); Fabio Giannetti, Los Gatos, CA (US); John Zaiss, Valley Park, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 169 days.

(21) Appl. No.: 16/685,078

(22) Filed: Nov. 15, 2019

(65) Prior Publication Data

US 2021/0149652 A1   May 20, 2021

(51) Int. Cl.
  *G06F 9/44* (2018.01)
  *G06F 8/60* (2018.01)
  *G06F 9/451* (2018.01)
  *H04L 67/00* (2022.01)

(52) U.S. Cl.
  CPC .............. *G06F 8/60* (2013.01); *G06F 9/453* (2018.02); *H04L 67/34* (2013.01)

(58) Field of Classification Search
  CPC ............ G06F 9/453; G06F 8/60; H04L 67/34
  USPC ......................................................... 717/172
  See application file for complete search history.

(56) References Cited

U.S. PATENT DOCUMENTS

| | | | | |
|---|---|---|---|---|
| 10,534,595 | B1* | 1/2020 | Lisuk | G06F 8/433 |
| 2008/0163164 | A1* | 7/2008 | Chowdhary | G06Q 10/06 |
| | | | | 717/106 |
| 2010/0064035 | A1* | 3/2010 | Branca | G06F 8/61 |
| | | | | 709/221 |
| 2016/0381133 | A1* | 12/2016 | Palavalli | H04L 67/10 |
| | | | | 709/226 |
| 2018/0241642 | A1* | 8/2018 | Patel | G06F 8/60 |
| 2019/0102157 | A1* | 4/2019 | Caldato | G06F 9/5083 |
| 2019/0312800 | A1* | 10/2019 | Schibler | H04L 41/082 |

* cited by examiner

*Primary Examiner* — Timothy A Mudrick

(57) ABSTRACT

A computerized method and system for containerized application deployment is disclosed that includes: receiving an identification of a containerized application; generating parameters for the containerized application; based at least on historical performance data for a previous deployment of the containerized application, optimizing the generated parameters for the containerized application to produce optimized parameters for the containerized application; validating the optimized parameters for the containerized application; committing the optimized parameters for the containerized application to a repository; and deploying a selected number of instances of the containerized application with the optimized parameters for the containerized application. This advantageously brings operational data into deployment optimization in order to permit optimization based on actual historical performance data. Some examples provide for rollback to previously-deployed configurations, due to the commit of parameters for the containerized application in a repository that permits enhanced version tracking.

20 Claims, 7 Drawing Sheets

CONTAINERIZED APPLICATION DEPLOYMENT

BACKGROUND

When deploying containerized applications ("apps"), teams may struggle with determining optimal configurations. Although updates during runtime are often possible, some changes may actually worsen performance. Further, changes made during runtime may result in the loss of prior deployment parameter configurations. Additionally, when multiple apps share a cluster, there may be conflicts for resources and challenges with security, affinity/anti-affinity rules, and other aspects of deployment.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method and system for containerized application deployment is disclosed that includes: receiving an identification of a containerized application; generating parameters for the containerized application; based at least on historical performance data for a previous deployment of the containerized application, optimizing the generated parameters for the containerized application to produce optimized parameters for the containerized application; validating the optimized parameters for the containerized application; committing the optimized parameters for the containerized application to a repository; and deploying a selected number of instances of the containerized application with the optimized parameters for the containerized application.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Corresponding reference characters indicate corresponding parts throughout the drawings. In the figures, the systems are illustrated as schematic drawings. The drawings may not be to scale.

DETAILED DESCRIPTION

Figure 1:
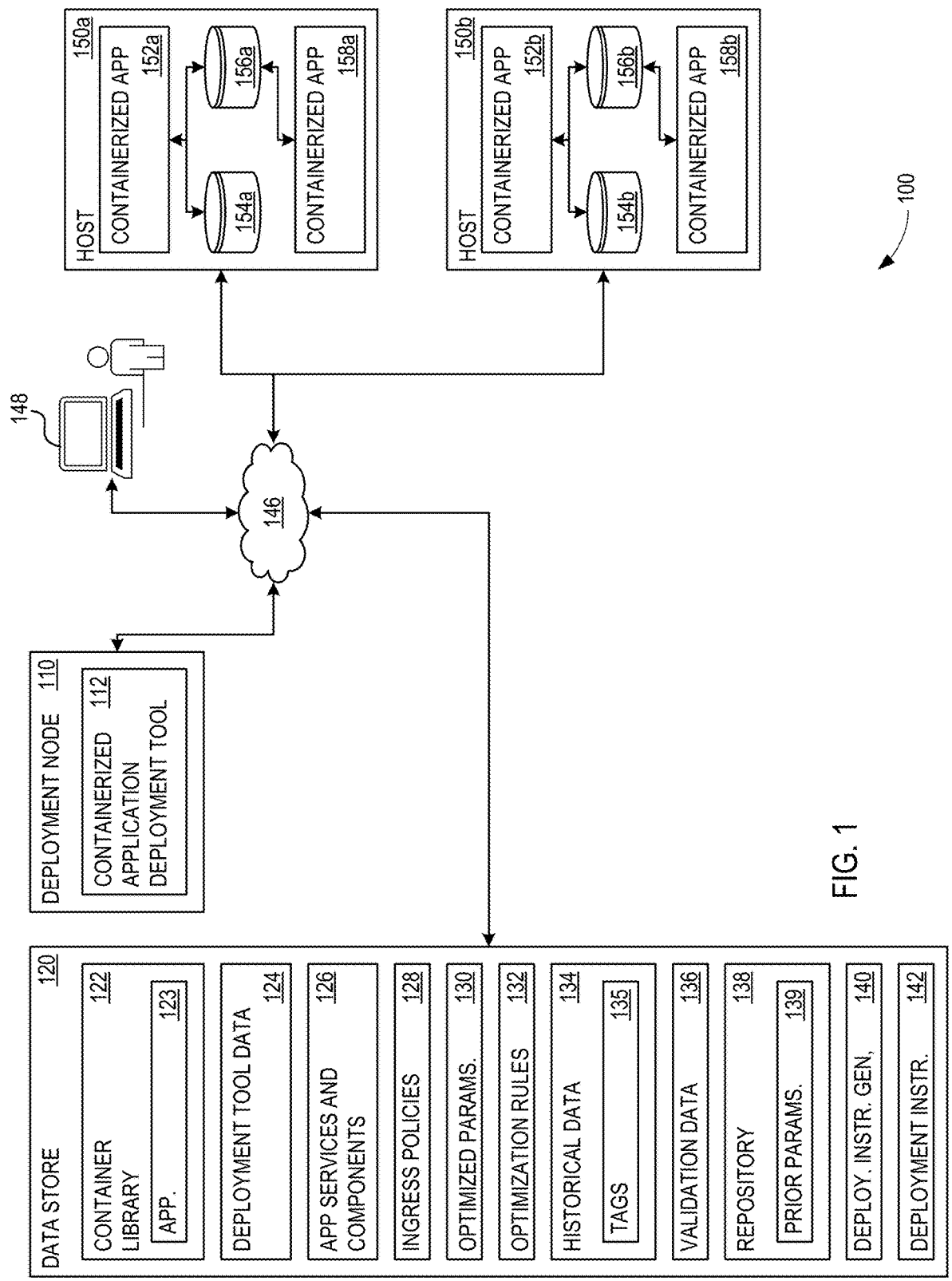
FIG. 1 is a block diagram illustrating an exemplary arrangement that can advantageously employ containerized application deployment as disclosed herein.

Being able to optimally deploy container based applications, while minimizing maintenance and failures, is valuable. However, this typically is most readily achievable by leveraging best practices and squeezing out opportunities for human error. Unfortunately, deployments into some environments may be challenging, due to noisy neighbors and limited insight into optimal resources utilization. If deployments are managed correctly, though, applications can run smoothly, reducing maintenance, downtime and operational costs.

Aspects of the disclosure provide for an improved containerized application deployment tool and associated methods. A computerized method and system for containerized application deployment is disclosed that includes: receiving an identification of a containerized application; generating parameters for the containerized application; based at least on historical performance data for a previous deployment of the containerized application, optimizing the generated parameters for the containerized application to produce optimized parameters for the containerized application; validating the optimized parameters for the containerized application; committing the optimized parameters for the containerized application to a repository; and deploying a selected number of instances of the containerized application with the optimized parameters for the containerized application.

The disclosure advantageously brings operational data into deployment optimization in order to permit optimization based on actual historical performance data. Some examples provide for rollback to previously-deployed configurations, due to the commit of parameters for the containerized application in a repository that permits enhanced version tracking. This disclosure provides coordination among simultaneous deployments of different applications and provides for improved optimization support.

A tool is disclosed that brings operational data into deployments, so that subsequent deployments, optimized using historical operational data, are able to execute differently from the previous deployments. The tool guides application owners to correctly decompose their application deployment incorporating the best practices without need of previous knowledge or experience. Additionally, prior to a deployment, the tool can validate the proposed deployment to correct conflicts and other potential mistakes, thereby reducing human-introduced error. For example, some examples of the tool use templates to validate that the initial deployment parameters specify too much memory (or an insufficient amount), and prompt the user with a balance between peak and normal running (fluctuating) resource needs. The amount of storage (e.g., ephemeral and persistent) can similarly be optimized to prevent waste while ensuring a sufficient amount. Further, some examples generate a set of deployment instructions that are templatized and tuned to deploy in a containerized environment or orchestrator. Deployment data is appropriately tagged and monitored to provide further insight into performance and cost to enable improvement on best practices and provide new suggestions. In these manners, aspects of the disclosure improve the allocation of computing resources, use less processing resources, and use less storage resources.

In some examples, a set of yet another markup language (YAML) files are used that have pre-defined variables, which transform the YAML files into templates. In some examples, the YAML files are committed into a change management platform, such as a Git repository. In some examples, the tool of the disclosure has a wizard, which includes a user interface (UI) that navigates a user to express components, services, and other parameters that comprise the application. This reduces the complexity of correctly configuring deployments and offers additional advantages for performance, scalability, availability, and compliance. In this manner, the disclosures improves the human-machine interface with more efficient interaction. In some examples, the tool further provides estimated running costs and can compare estimates with actual running costs. For example, the costs can be in terms of memory, processor, and storage usage. Both on premise ("on-prem") and off premise ("off-prem") deployments are supportable.

After a period of execution, some examples of the tool are able to retrieve collected historical data, allowing a user to identify typical usage and adjust future deployments to optimize resource allocation and potentially reduce costs. The tool permits understanding of the historical resource usage versus deployment requests, which enables fine-tuning of resource consumption based on actual historical operational data.

FIG. 1 illustrates an arrangement 100 that can advantageously employ containerized application deployment as disclosed herein. A deployment node 110 is able to deploy containerized applications (apps) to app hosts 150*a* and 150*b*, by leveraging a containerized application deployment tool 112. The tool 112 is operational to receive an identification of a containerized application 123; generate parameters for the containerized application 123; based at least on historical performance data 134 for a previous deployment of the containerized application 123, optimize the generated parameters for the containerized application 123 to produce optimized parameters 130 for the containerized application 123; validate the optimized parameters 130 for the containerized application 123; commit the optimized parameters 130 for the containerized application 123 to a repository 138; and deploy a selected number of instances of the containerized application 152*a* and 152*b* with the optimized parameters 130 for the containerized application 123. In some examples, the instances of the containerized application 152*a* and 152*b* are deployed on the app hosts 150*a* and 150*b* over a network 146. Although two app hosts 150*a* and 150*b* are shown, it should be understood that a different number is used in other examples.

As illustrated, a user at a user node 148 accesses the deployment node 110 over the network 146, although, in some examples, the user node 148 and the deployment node 110 are coincident. The tool 112 draws data from, and stores data in a data store 120. Although a single data store 120 is show, it should be understood that the single data store 120 is notional and the data may be stored among multiple locations, whether locally on the deployment node 110, or a different number of nodes across the network 146.

The data store 120 holds multiple data sets, which will be described in relation to a flow chart 200 in FIG. 2. Additionally, app hosts 150 *a* and 150 *b* are shown as including multiple components, which will also be described in relation to the flow chart 200. Any of the deployment node 110, the data store 120, the user node 148, and the app hosts 150 *a* and 150 *b* may be implemented as a computing apparatus 718 of FIG. 7, or another suitable computational asset.

Figure 2:
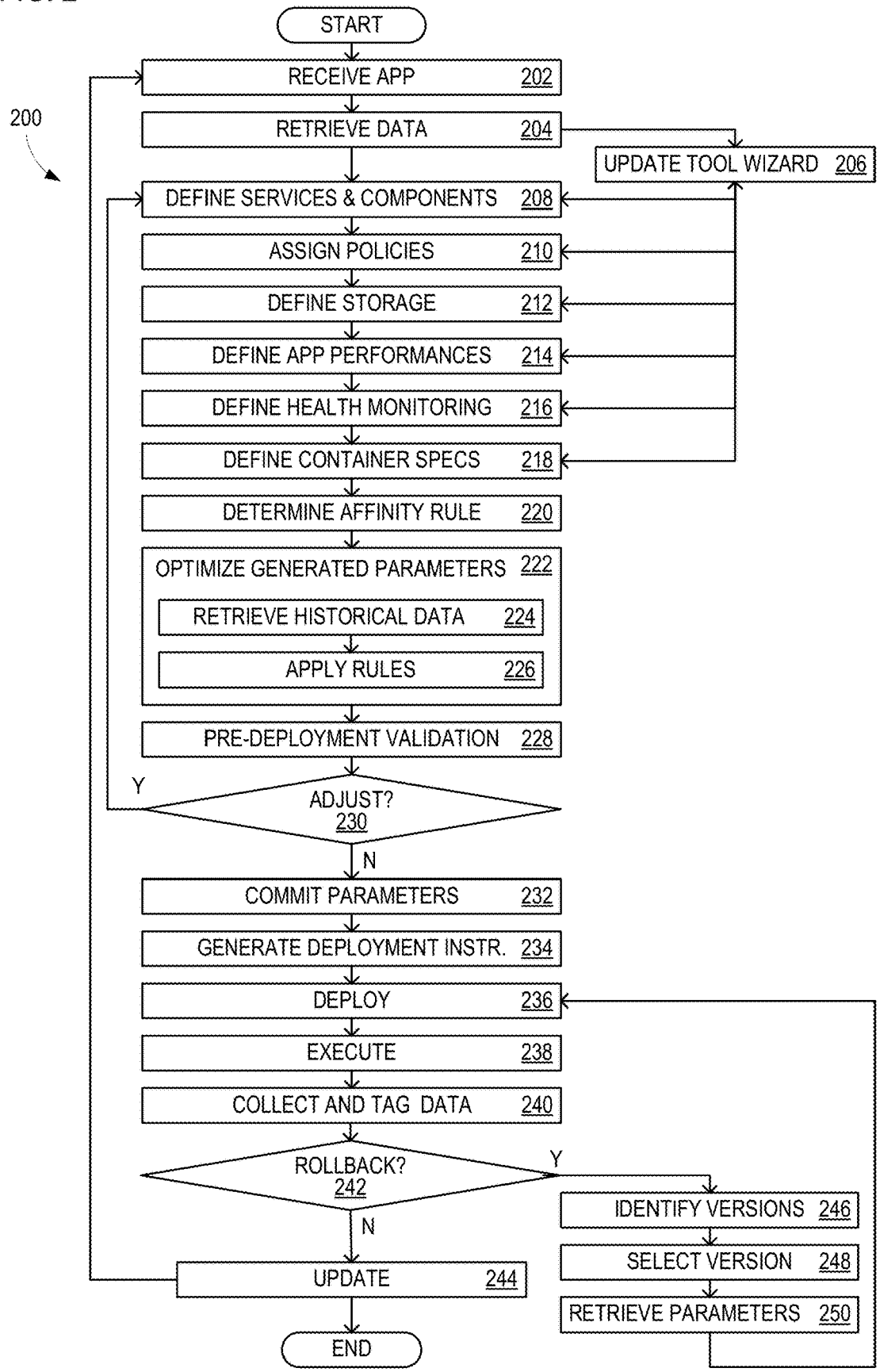
FIG. 2 is a flow chart illustrating operations associated with the arrangement of FIG. 1, according to an embodiment.

The flow chart 200 of FIG. 2 illustrates operations associated with the arrangement 100 of FIG. 1. In some examples, at least some of the operations described for the flow chart 200 are performed by the computing apparatus 718 of FIG. 7, or another suitable computational asset. The flow chart 200 commences with operation 202, which includes receive an identification of a containerized application. For example, containerized application 123, stored within a container library 122, is identified in a deployment wizard 300 of the tool 112, as shown in FIG. 3.

Before returning to FIG. 2, the user interface (UI) of the deployment wizard 300 will be described in relation to FIG. 3. The exemplary deployment wizard 300 includes a series of tabs 302-318 that control the generation of the parameters with decreasing granularity from left to right. The illustrated tabs include an App Details tab 302, a Service tab 304, an Ingress tab 306, a Volumes tab 308, a Performance tab 310, a Health tab 312, a Container tab 314, an Optimize tab 316, and a Submit tab 318. Additionally, a forward control button 340 moves the deployment wizard 300 to the next tab to the right, and a back control button 342 moves the deployment wizard 300 to the next tab to the left. Multiple parameter entry windows 322-332 permit entry, editing, and verification of generated parameters, dependent upon the specific parameters related to the selected one of tabs 302-318. The parameter entry windows 322-332 are illustrated generally, although they are replaced with specific windows, such as scroll boxes or other UI elements, based on the specific currently-selected one of tabs 302-318.

Figure 3:
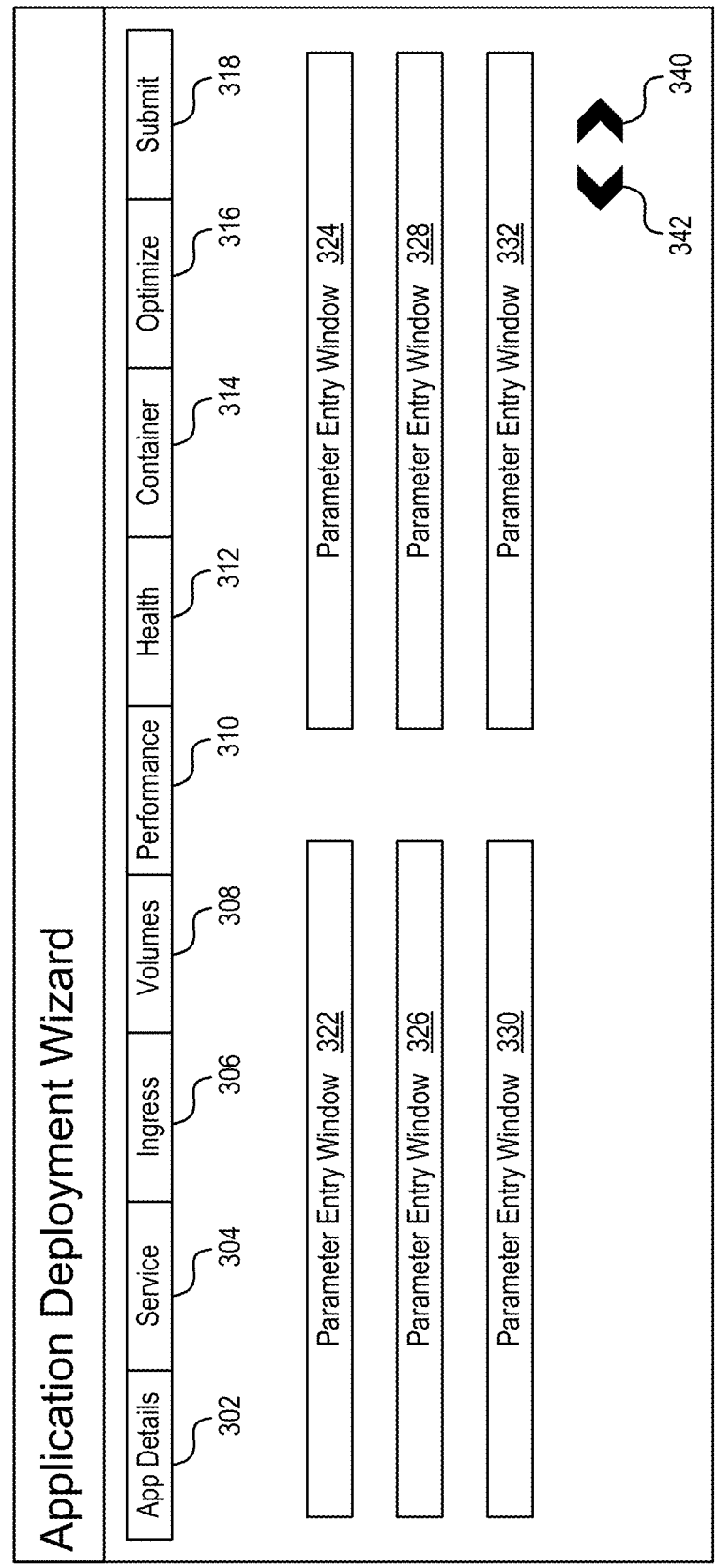
FIG. 3 shows a user interface (UI) for an exemplary deployment tool wizard.

FIGS. 1, 2 and 3 may be viewed together. For example, when the App Details tab 302 is active, the flow chart 200 is within operation 202. Flow chart 200 illustrates a process guiding containerized application deployment based on prior-determined operational data. That is, tool 112 guides application owners to correctly decompose their application deployment incorporating the best practices without need of previous knowledge or experience. The parameter entry windows 322-332 permit entry of an application name, a target environment, a target region, a repository path, a repository revision number, and others. In operation 204 of the flow chart 200, the deployment tool data 124, which includes predetermined configuration data, is retrieved and used to prepopulate at least some fields in the deployment wizard 300. In some examples, as the user moves through the various tabs 302-318, at least some of which correspond to operations 202 and 208-218, the deployment wizard 300 is updated (pre-populated) with data in operation 206, based at least on the currently-entered parameters.

Operations 202-220 may be viewed together as generating parameters for a containerized application. In some examples, generating parameters for the containerized application 123 comprises importing predetermined configuration data (deployment tool data 124) into the containerized application deployment tool 112, such as in operation 204. Thus, for operation 206, generating parameters for the containerized application 123 further comprises, based at least on a change to the parameters for the containerized application 123, importing additional predetermined configuration data (deployment tool data 124) into the containerized application deployment tool 112.

In operation 208, the user defines application services and components that may be retrieved from application services and components data 126. During this operation, the Service tab 304 of the deployment wizard 300 is selected. The parameter entry windows 322-332 permit entry of service component names, types, and ports. Policies, for example ingress policies, are assigned to services and/or components in operation 210, with the Ingress tab 306 of the deployment wizard 300 selected. The parameter entry windows 322-332 permit entry of host names, such as for example the names of the app hosts 150a and 150b. In some examples, ingress policy data 128 is imported from the data store 120.

Storage (e.g., one or more volumes) is defined in operation 212. During this operation, the Volumes tab 308 of the deployment wizard 300 is selected. The parameter entry windows 322-332 permit entry of a volume name, a mount path, and secrets that are used for authentication. In some examples, the storage is defined as persistent. The amount of storage (e.g., disk size), access type, and other storage parameters are also specified at this point, using the parameter entry windows 322-332. Operation 214 includes defining application performance. During this operation, the Performance tab 310 of the deployment wizard 300 is selected. The parameter entry windows 322-332 permit entry of the number of instances, an upgrade strategy, and requests and limits for memory, processors, and ephemeral storage.

As part of the assistance with reduction in human errors, in some examples, as a request for some amount of memory, processors, or storage is adjusted, the limiting parameter is automatically adjusted by the deployment wizard 300, based upon best practices derived from prior experiences. For example, workable options are precomputed (based on experience) to avoid performance problems. Limits may be based on hardware, such as a memory reservation cannot exceed the amount of available memory, and in some scenarios, the hardware memory is to be shared among multiple applications. In some examples, as a user inputs requests, the limits automatically change.

Operation 216 includes defining application health checks, for example liveness and readiness. During this operation, the Health tab 312 of the deployment wizard 300 is selected. The parameter entry windows 322-332 permit entry of health-related parameters, such as keys and values for liveness and readiness. Container specifications are defined in operation 218. During this operation, the Container tab 314 of the deployment wizard 300 is selected. The parameter entry windows 322-332 permit entry of image location, image version, image pull policy, additional ports, protocols, container arguments, and environment variables. In some examples, when a user specifies a number of failures that must be tolerated, the deployment wizard 300 calculates the number of instances needed.

An affinity rule is determined in operation 220 to ensure deployment on different physical machines, so that a single hardware failure does not take all instances off-line. An affinity rule is a setting that establishes a relationship between two or more virtual machines (VMs) and hosts. In some examples, the tool 112 has a rule set that is based on prior experience and best practices. At this point, the initial generation of parameters for the containerized application 123 is ready for optimization. The containerized application parameters generated thus far include at least one specification selected from the list consisting of: an amount of memory, an amount of processor resources, an amount of ephemeral storage, an amount of persistent storage, an ingress policy, a service, and a component.

Optimizing the generated parameters in the example of operation 222, to produce optimized parameters 130, requires that the containerized application 123 had already been deployed, and that historical performance data 134 had already been collected and tagged with tags 135. In this manner, deployment data from prior deployments is appropriately tagged and monitored to provide further insight into performance and cost, to enable improvement on best practices and provide new suggestions. During an initial deployment, in some examples, operation 222 is not available with all features. In the deployment wizard 300, the Optimize tab 316 is selected at this point. Operation 222 includes operations 224 and 226. In operation 224, historical performance data 134 is retrieved. The collection of the historical performance data 134 will be described relative to operation 240, which had occurred during a prior pass through the flow chart 200. In operation 226, optimization rules 132 are applied. The optimization rules 132 are used along with the historical performance data 134. Operation 222 thus includes, based at least on historical performance data 134 for a previous deployment of the containerized application 123, optimizing the generated parameters for the containerized application to produce optimized parameters 130 for the containerized application 123.

Figure 4:
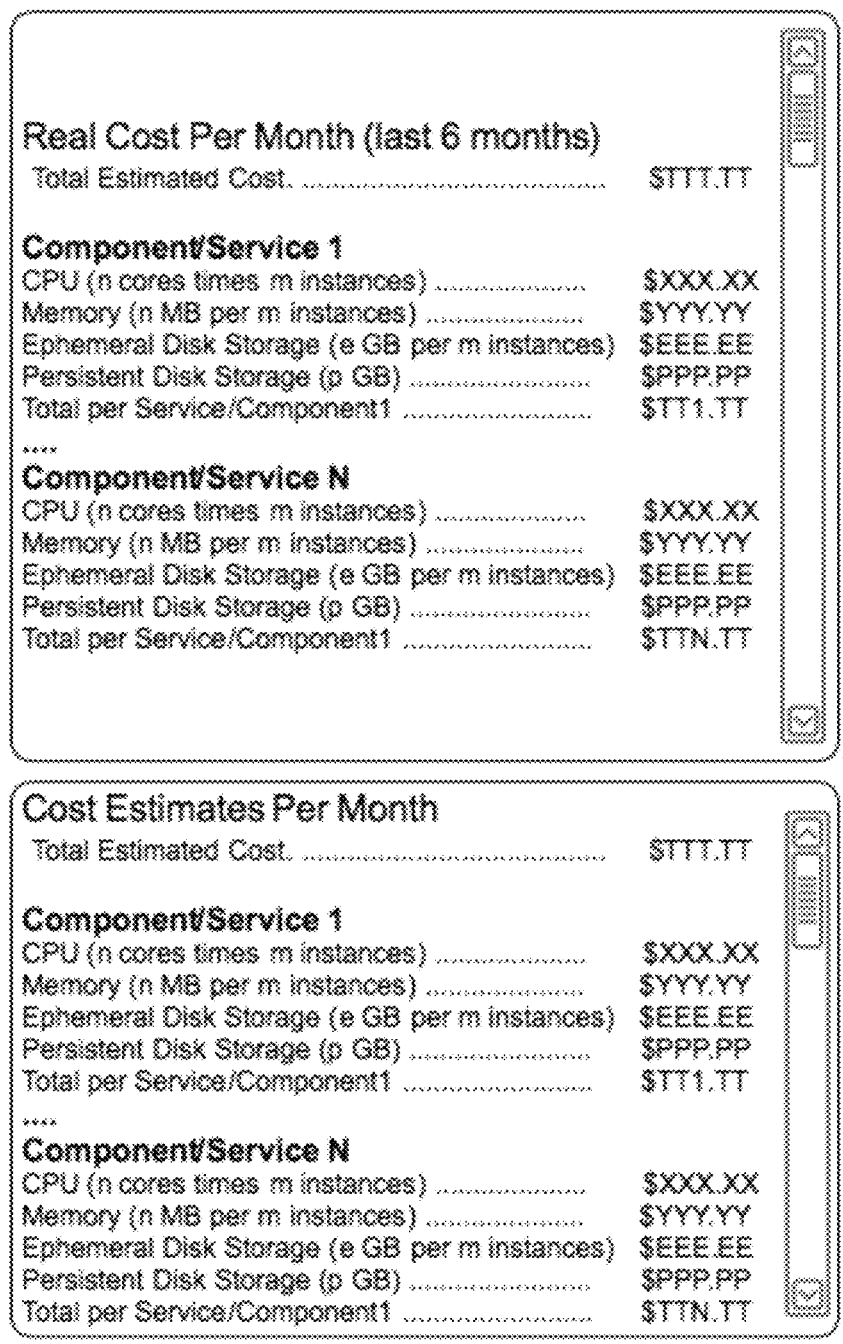
FIG. 4 shows a notional exemplary optimization report for a containerized application.

Some examples predict the monthly cost of a deployment in terms of memory, processor, and disk usage; calculate projections; compare actual running costs with estimated running costs; and determine deployment changes based on the historical performance data 134. This brings operational data into deployments, and permits automatic adjustments, based at least on the optimization rules 132. For example, memory and/or disk space can be increased or decreased, based upon whether the limits are nearly reached, or are remote. As an additional example, the number of instances may be increased or decreased automatically, based at least on the historical performance data 134 and the optimization rules 132. FIG. 4 shows a notional exemplary report 400 from the deployment wizard 300 during operation 222.

Figure 5:
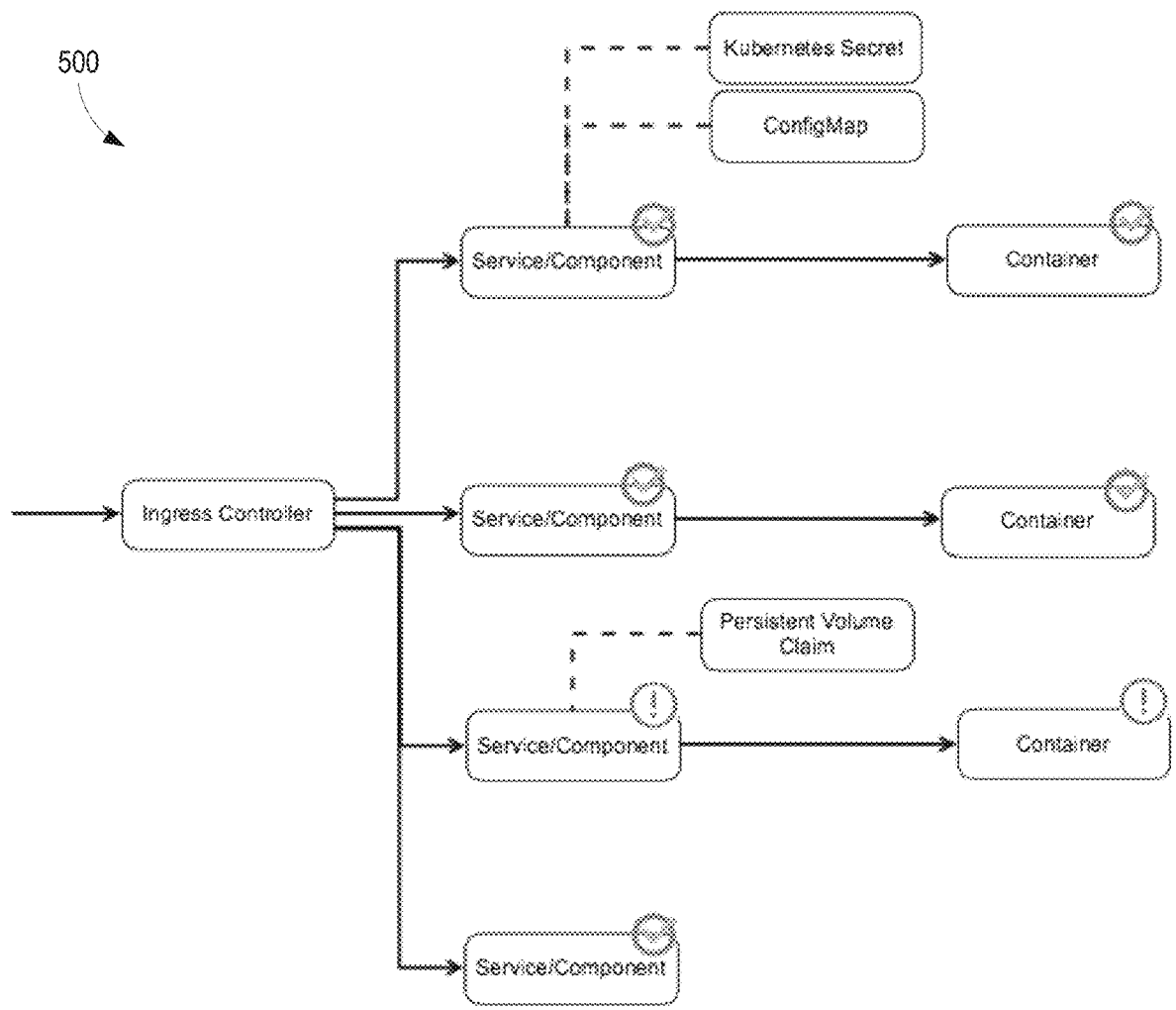
FIG. 5 shows an exemplary validation report for a containerized application.

Next, the user is able to perform a pre-deployment validation, in operation 228 by selecting the Submit tab 318 of the deployment wizard 300. Operation 228 thus includes validating the optimized parameters for the containerized application 123. A sample validation report 500 is shown in FIG. 5. Validation data 136 in data store 120 includes validation rules that perform deconfliction of resources and resolve potential application crash issues. Operation 228 looks for inconsistencies and set-ups that prevent data access, among other potential problems.

For example (in FIG. 1), app host 150a has the containerized application 152a and also another containerized application 158a. As illustrated, containerized application 152a has exclusive access to storage 154a, but shares storage 156a with the containerized application 158a. App host 150b has a similar configuration for the containerized application 152b, a containerized application 158b, storage 154b, and storage 156b. If, during deployment of containerized application 152a, the deployment defines shared storage 156a differently than shared storage 156a had been defined during an earlier deployment of the containerized application 158a, this would create runtime problems. Because deployment parameters are stored within the data store 120 (e.g., as validation data 136 and/or in a repository 138), such conflicts can be checked and resolved prior to deployment. FIG. 5 shows an exemplary validation report 500 that indicates a problem requiring resolution.

Decision operation 230 prompts the user to either correct or confirm parameter values associated with discovered suspected conflicts or other problems. If the user needs to make an adjustment, the flow chart 200 returns to operation 208 (or later). Otherwise, the tool 112 commits the optimized parameters 130 for the containerized application 123 to the repository 138, in operation 232. On subsequent deployments (updates, redeployments) of the containerized application 123, the committed parameters become prior parameters 139, which are useable in operation 222 for optimization. Additionally, for deployments of other applications, prior parameters 139 are useable for validation of other applications that share some of the same resources. Operation 234 generates a set of deployment instructions 142 using a deployment instruction generator 140. The set of deployment instructions 142 is templatized and tuned to deploy app 123 in a containerized environment.

Operation 236 includes deploying a selected number of instances (e.g., selected by the deployment wizard 300 in operation 214) of the containerized application 123 with the optimized parameters 130 for the containerized application 123. In some examples, deploying the selected number of instances of the containerized application 123 comprises deploying the selected number of instances of the containerized application 123 in accordance with an affinity rule. The deployed instances are then executed in operation 238. Operation 240 collects the historical performance data 134 from the deployment of the containerized application and tags the historical performance data 134 with tags 135. During a subsequent pass through the flow chart 200, such as during a subsequent deployment of the containerized application 123, this collected data becomes historical performance data from a previous deployment of the containerized application 123.

Decision operation 242 determines whether the deployed application is performing sufficiently poorly that a rollback is needed. If not, then the deployed application will be updated in operation 244 based on update criteria, which returns the flow chart to operation 202. However, if the application's operational performance does merit a rollback, various examples permit rollback to the immediately prior deployment, or selection of an even earlier deployment. Rollbacks to prior deployments are feasible because of the availability of the prior parameters 139 in the repository 138.

In support of a rollback procedure, operation 246 includes identifying, within the repository 138, a plurality of the prior parameters 139 for the containerized application 123. Operation 248 includes selecting prior parameters from among the plurality of the prior parameters 139 for the containerized application 123. Operation 250 includes retrieving, from the repository 138, the selected prior parameters for the containerized application 123 for a previous deployment of the containerized application 123. For examples enabling rollback only to the immediately-prior version, operations 246 and 248 are not performed. Instead, operation 250 includes retrieving, from the repository 138, the prior parameters 139 for the containerized application 123 for a previous deployment of the containerized application 123. After retrieving the prior deployment information, the flow chart 200 returns to operation 236 which includes deploying at least one instance of the containerized application 123 with the prior parameters 139.

Figure 6:
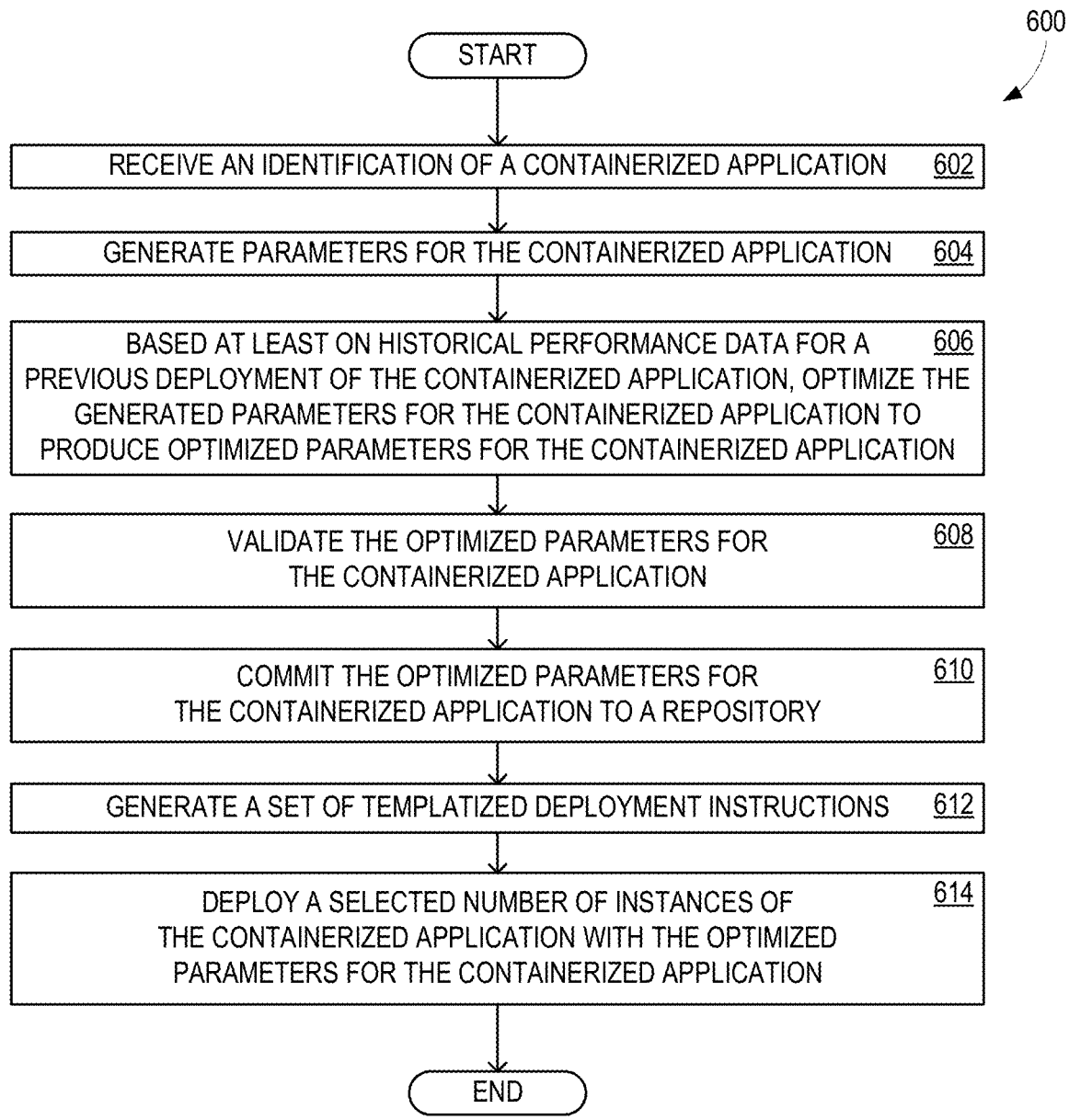
FIG. 6 is another flow chart illustrating operations associated with the arrangement of FIG. 1, according to an embodiment.

FIG. 6 is an exemplary flow chart 600 illustrating operations associated with the arrangement 100 of FIG. 1. In some examples, at least some of the operations described for the flow chart 600 are performed by the computing apparatus 718 of FIG. 7, or another suitable computational asset. The flow chart 600 commences with operation 602, which includes receiving an identification of a containerized application. In some examples, the containerized application parameters include at least one specification selected from the list consisting of: an amount of memory, an amount of processor resources, an amount of ephemeral storage, an amount of persistent storage, an ingress policy, a service, and a component. Operation 604 includes generating parameters for the containerized application. In some examples, generating parameters for the containerized application comprises importing predetermined configuration data into a containerized application deployment tool. In some examples, generating parameters for the containerized application further comprises, based at least on a change to the parameters for the containerized application, importing additional predetermined configuration data into the containerized application deployment tool.

Operation 606 includes, based at least on historical performance data for a previous deployment of the containerized application, optimizing the generated parameters for the containerized application to produce optimized parameters for the containerized application. Operation 608 includes validating the optimized parameters for the containerized application. Operation 610 includes committing the optimized parameters for the containerized application to a repository. Operation 612 generates a set of templatized deployment instructions. Some examples omit operation 612. Operation 614 includes deploying a selected number of instances of the containerized application with the optimized parameters for the containerized application. In some examples, deploying the selected number of instances of the containerized application comprises deploying the selected number of instances of the containerized application in accordance with an affinity rule.

Some examples further include collecting the historical performance data from the previous deployment of the containerized application. Some examples further include retrieving, from the repository, prior parameters for the containerized application for a previous deployment of the containerized application; and deploying at least one instances of the containerized application with the prior parameters. In some examples, retrieving, from the repository, prior parameters for the containerized application for a previous deployment of the containerized application includes: identifying, within the repository, a plurality of prior parameters for the containerized application; selecting prior parameters from among the plurality of prior parameters for the containerized application; and retrieving, from the repository, the selected prior parameters for the containerized application for a previous deployment of the containerized application.

Exemplary Operating Environment

Figure 7:
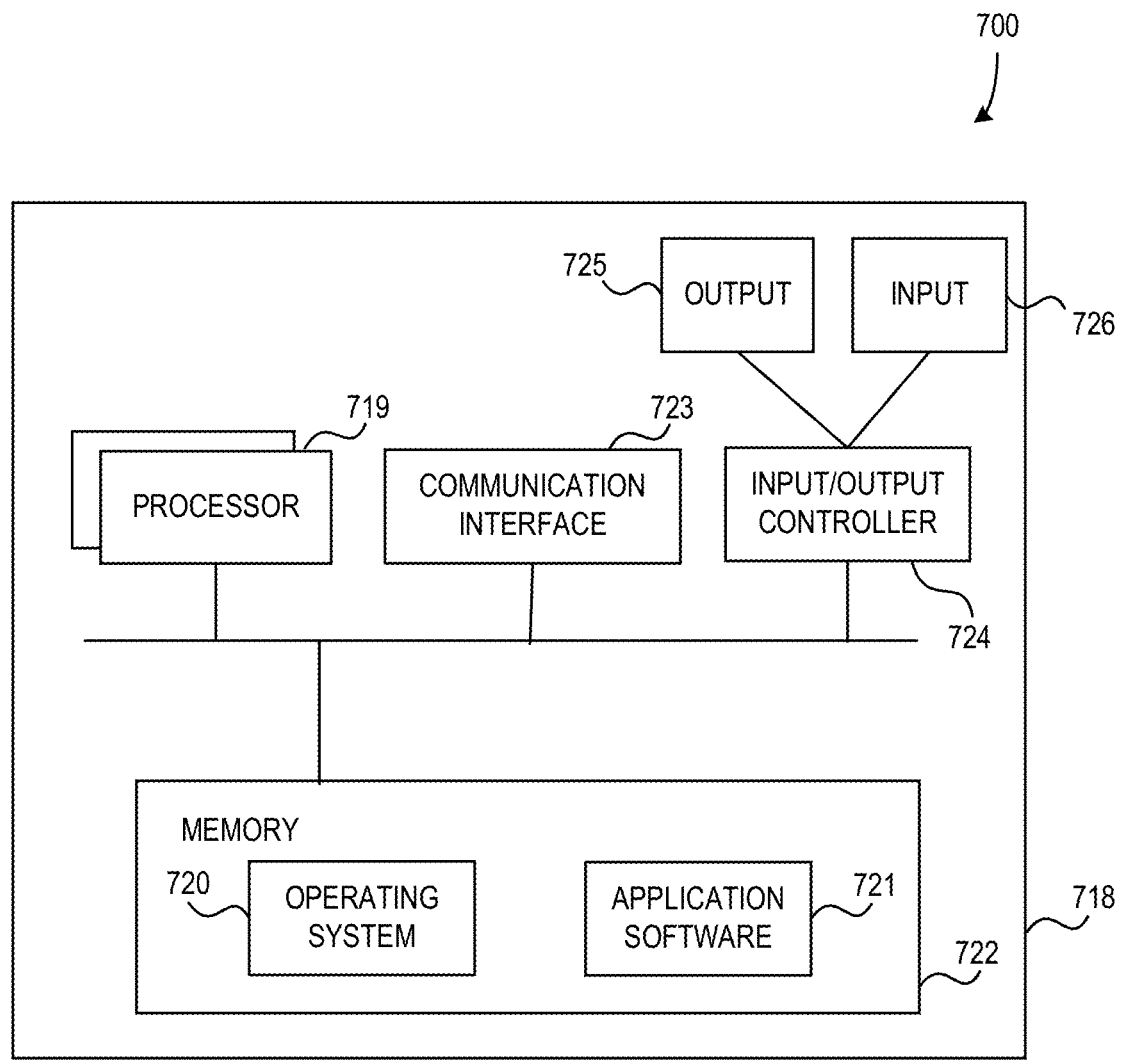
FIG. 7 illustrates a computing apparatus according to an embodiment as a functional block diagram.

The present disclosure is operable with a computing apparatus according to an embodiment as a functional block diagram 700 in FIG. 7. In an embodiment, components of a computing apparatus 718 may be implemented as a part of an electronic device according to one or more embodiments described in this specification. The computing apparatus 718 comprises one or more processors 719 which may be microprocessors, controllers or any other suitable type of processors for processing computer executable instructions to control the operation of the electronic device. Platform software comprising an operating system 720 or any other suitable platform software may be provided on the apparatus 718 to enable application software 721 to be executed on the device. According to an embodiment, containerized application deployment as described herein may be accomplished by software.

Computer executable instructions may be provided using any computer-readable media that are accessible by the computing apparatus 718. Computer-readable media may include, for example, computer storage media such as a memory 722 and communications media. Computer storage media, such as a memory 722, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that the storage may be distributed or located remotely and accessed via a network or other communication link (e.g. using a communication interface 723).

The computing apparatus 718 may comprise an input/output controller 724 configured to output information to one or more output devices 725, for example a display or a speaker, which may be separate from or integral to the electronic device. The input/output controller 724 may also be configured to receive and process an input from one or more input devices 726, for example, a keyboard, a microphone or a touchpad. In one embodiment, the output device 725 may also act as the input device. An example of such a device may be a touch sensitive display. The input/output controller 724 may also output data to devices other than the output device, e.g. a locally connected printing device. In some embodiments, a user may provide input to the input device(s) 726 and/or receive output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

A system for containerized application deployment comprises at least one processor; and at least one memory comprising computer program code. The at least one memory and the computer program code are configured to, with the at least one processor, cause the at least one processor to perform operations such as:
  receive an identification of a containerized application;
  generate parameters for the containerized application;
  based at least on historical performance data for a previous deployment of the containerized application, optimize the generated parameters for the containerized application to produce optimized parameters for the containerized application;
  validate the optimized parameters for the containerized application;
  commit the optimized parameters for the containerized application to a repository;
  generate a set of templatized deployment instructions; and
  using the generated set of templatized deployment instructions, deploy a selected number of instances of the containerized application with the optimized parameters for the containerized application.

A computerized method for containerized application deployment comprises:
  receiving an identification of a containerized application;
  generating parameters for the containerized application;
  based at least on historical performance data for a previous deployment of the containerized application, optimizing the generated parameters for the containerized application to produce optimized parameters for the containerized application;

validating the optimized parameters for the containerized application;

committing the optimized parameters for the containerized application to a repository; and deploying a selected number of instances of the containerized application with the optimized parameters for the containerized application.

One or more computer storage media have computer-executable instructions for containerized application deployment that, upon execution by a processor, cause the processor to at least:

receive an identification of a containerized application;

generate parameters for the containerized application;

based at least on historical performance data for a previous deployment of the containerized application, optimize the generated parameters for the containerized application to produce optimized parameters for the containerized application;

validate the optimized parameters for the containerized application;

commit the optimized parameters for the containerized application to a repository; and deploy a selected number of instances of the containerized application with the optimized parameters for the containerized application in accordance with an affinity rule.

Alternatively, or in addition to the other examples described herein, examples include any combination of the following:

wherein the containerized application parameters include at least one specification selected from the list consisting of: an amount of memory, an amount of processor resources, an amount of ephemeral storage, an amount of persistent storage, an ingress policy, a service, and a component;

wherein generating parameters for the containerized application comprises importing predetermined configuration data into a containerized application deployment tool.

wherein generating parameters for the containerized application further comprises, based at least on a change to the parameters for the containerized application, importing additional predetermined configuration data into the containerized application deployment tool;

wherein deploying the selected number of instances of the containerized application comprises deploying the selected number of instances of the containerized application in accordance with an affinity rule;

collect the historical performance data from the previous deployment of the containerized application;

tag the collected historical performance data;

retrieve, from the repository, prior parameters for the containerized application for a previous deployment of the containerized application; and deploy at least one instances of the containerized application with the prior parameters; and wherein retrieving, from the repository, prior parameters for the containerized application for a previous deployment of the containerized application comprises identifying, within the repository, a plurality of prior parameters for the containerized application; selecting prior parameters from among the plurality of prior parameters for the containerized application; and retrieving, from the repository, the selected prior parameters for the containerized application for a previous deployment of the containerized application.

collect the historical performance data from the previous deployment of the containerized application; identify, within the repository, a plurality of prior parameters for the containerized application; select prior parameters from among the plurality of prior parameters for the containerized application; retrieve, from the repository, the selected prior parameters for the containerized application for a previous deployment of the containerized application; and deploy at least one instances of the containerized application with the selected prior parameters.

Any range or device value given herein may be extended or altered without losing the effect sought, as will be apparent to the skilled person. While no personally identifiable information is tracked by aspects of the disclosure, examples have been described with reference to data monitored and/or collected, possibly from users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items. The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements. The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for guiding containerized application deployment based on prior-determined operational data, the system comprising:
    at least one processor; and
    at least one memory comprising computer program code, the at least one memory and the computer program code configured to, with the at least one processor, cause the at least one processor to:
        receive an identification of a containerized application, wherein the containerized application is to be subsequently deployed and executed;
        generate parameters for the containerized application;
        based at least on historical performance data for a previous deployment of the containerized application, optimize the generated parameters for the containerized application to produce optimized parameters for the containerized application;
        perform a pre-deployment validation of the optimized parameters for the containerized application;
        commit the optimized parameters for the containerized application to a repository;
        generate a set of templatized deployment instructions;
        using the generated set of templatized deployment instructions, deploy a selected number of instances of the containerized application with the optimized parameters for the containerized application; and
        execute the deployed selected number of instances of the containerized application.

2. The system of claim 1, wherein the containerized application parameters include at least one specification selected from a list consisting of:
    an amount of memory, an amount of processor resources, an amount of ephemeral storage, an amount of persistent storage, an ingress policy, a service, and a component;
    wherein a limiting parameter for at least one of the containerized application parameters is automatically adjusted by a deployment wizard in a containerized application deployment tool.

3. The system of claim 1, wherein generating parameters for the containerized application comprises:
    importing predetermined configuration data into a containerized application deployment tool; and
    calculating, by a deployment wizard in the containerized application deployment tool, the selected number of instances of the containerized application based on receiving a number of failures to be tolerated upon deploying the containerized application.

4. The system of claim 3, wherein generating parameters for the containerized application further comprises:
    based at least on a change to the parameters for the containerized application, importing additional predetermined configuration data into the containerized application deployment tool.

5. The system of claim 1, wherein deploying the selected number of instances of the containerized application comprises:
    deploying the selected number of instances of the containerized application in accordance with an affinity rule.

6. The system of claim 1, the at least one memory and the computer program code configured to, with the at least one processor, further cause the at least one processor to:
    collect the historical performance data from the previous deployment of the containerized application; and
    tag the collected historical performance data.

7. The system of claim 1, the at least one memory and the computer program code configured to, with the at least one processor, further cause the at least one processor to:
    retrieve, from the repository, prior parameters for the containerized application for the previous deployment of the containerized application; and
    deploy at least one instance of the containerized application with the prior parameters.

8. The system of claim 7, wherein retrieving, from the repository, the prior parameters for the containerized application for the previous deployment of the containerized application comprises:
    identifying, within the repository, a plurality of prior parameters for the containerized application;
    selecting one or more prior parameters from among the plurality of prior parameters for the containerized application; and
    retrieving, from the repository, the selected one or more prior parameters for the containerized application for the previous deployment of the containerized application.

9. A computerized method for containerized application deployment, the method comprising:
    receiving an identification of a containerized application, wherein the containerized application is to be subsequently deployed and executed;
    generating parameters for the containerized application;
    based at least on historical performance data for a previous deployment of the containerized application, optimizing the generated parameters for the containerized application to produce optimized parameters for the containerized application;
    performing a pre-deployment validation of the optimized parameters for the containerized application;
    committing the optimized parameters for the containerized application to a repository;
    deploying a selected number of instances of the containerized application with the optimized parameters for the containerized application; and
    executing the deployed selected number of instances of the containerized application.

10. The computerized method of claim 9, wherein the containerized application parameters include at least one specification selected from a list consisting of:
    an amount of memory, an amount of processor resources, an amount of ephemeral storage, an amount of persistent storage, an ingress policy, a service, and a component.

11. The computerized method of claim 9, wherein generating parameters for the containerized application comprises:
    importing predetermined configuration data into a containerized application deployment tool.

12. The computerized method of claim 11, wherein generating parameters for the containerized application further comprises:
based at least on a change to the parameters for the containerized application, importing additional predetermined configuration data into the containerized application deployment tool.

13. The computerized method of claim 9, wherein deploying the selected number of instances of the containerized application comprises:
deploying the selected number of instances of the containerized application in accordance with an affinity rule.

14. The computerized method of claim 9, further comprising:
collecting the historical performance data from the previous deployment of the containerized application.

15. The computerized method of claim 9, further comprising:
retrieving, from the repository, prior parameters for the containerized application for the previous deployment of the containerized application; and
deploying at least one instance of the containerized application with the prior parameters.

16. The computerized method of claim 15, wherein retrieving, from the repository, prior parameters for the containerized application for the previous deployment of the containerized application comprises:
identifying, within the repository, a plurality of prior parameters for the containerized application;
selecting one or more prior parameters from among the plurality of prior parameters for the containerized application; and
retrieving, from the repository, the selected one or more prior parameters for the containerized application for the previous deployment of the containerized application.

17. One or more computer storage media having computer-executable instructions for containerized application deployment that, upon execution by a processor, cause the processor to at least:
receive an identification of a containerized application, wherein the containerized application is to be subsequently deployed and executed;
generate parameters for the containerized application;
based at least on historical performance data for a previous deployment of the containerized application, optimize the generated parameters for the containerized application to produce optimized parameters for the containerized application;
perform a pre-deployment validation of the optimized parameters for the containerized application;
commit the optimized parameters for the containerized application to a repository;
deploy a selected number of instances of the containerized application with the optimized parameters for the containerized application in accordance with an affinity rule; and
execute the deployed selected number of instances of the containerized application.

18. The one or more computer storage media of claim 17, wherein the containerized application parameters include at least one specification selected from a list consisting of:
an amount of memory, an amount of processor resources, an amount of ephemeral storage, an amount of persistent storage, an ingress policy, a service, and a component.

19. The one or more computer storage media of claim 17, wherein generating parameters for the containerized application comprises:
importing predetermined configuration data into a containerized application deployment tool; and
based at least on a change to the parameters for the containerized application, importing additional predetermined configuration data into the containerized application deployment tool.

20. The one or more computer storage media of claim 17, wherein the computer-executable instructions, upon execution by a processor, further cause the processor to at least:
collect the historical performance data from the previous deployment of the containerized application;
identify, within the repository, a plurality of prior parameters for the containerized application;
select one or more prior parameters from among the plurality of prior parameters for the containerized application;
retrieve, from the repository, the selected one or more prior parameters for the containerized application for the previous deployment of the containerized application; and
deploy at least one instance of the containerized application with the selected one or more prior parameters.

* * * * *